United States Patent
Dreiss et al.

(10) Patent No.: US 12,480,519 B2
(45) Date of Patent: Nov. 25, 2025

(54) MECHANISM FOR MAINTAINING INTEGRITY OF PERMANENT MAGNETS IN DIRECTLY DRIVEN SEALLESS PUMPS AND TURBINES

(71) Applicant: Flowserve Pte. Ltd., Singapore (SG)

(72) Inventors: Andreas Dreiss, Geestland (DE); Neil Havrilla, Coplay, PA (US); Zachary Dennis, Emmaus, PA (US)

(73) Assignee: Flowserve Pte. Ltd., Singapore (SG)

( * ) Notice: Subject to any disclaimer, the term of this patent is extended or adjusted under 35 U.S.C. 154(b) by 54 days.

(21) Appl. No.: 18/407,950

(22) Filed: Jan. 9, 2024

(65) Prior Publication Data

US 2025/0226711 A1     Jul. 10, 2025

(51) Int. Cl.
    *F04D 29/22*     (2006.01)
    *F04D 1/04*     (2006.01)
    (Continued)

(52) U.S. Cl.
    CPC .............. *F04D 29/22* (2013.01); *F04D 7/02* (2013.01); *F04D 13/06* (2013.01); *H02K 1/2795* (2022.01);
    (Continued)

(58) Field of Classification Search
    CPC . F04D 7/02; F04D 13/06; F04D 29/22; F04D 1/04; F04D 13/024; F04D 13/0653;
    (Continued)

(56) References Cited

U.S. PATENT DOCUMENTS

| | | |
|---|---|---|
| 1,632,357 A | 6/1927 | White |
| 1,949,796 A | 3/1934 | Himmel |
| | (Continued) | |

FOREIGN PATENT DOCUMENTS

| | | | |
|---|---|---|---|
| BE | 1018187 A3 * | 7/2010 | ............. H02K 15/03 |
| EP | 2626573 A1 | 8/2013 | |
| | (Continued) | | |

OTHER PUBLICATIONS

BE1018187A3 translation (Year: 2025).*
(Continued)

*Primary Examiner* — David N Brandt
(74) *Attorney, Agent, or Firm* — Maine Cernota & Curran

(57) ABSTRACT

An integral motor pump (IMP) or turbine (IMT) applicable to a low temperature process liquid, such as liquid hydrogen, includes an impeller having an annular ring of permanent magnets attached thereto passing in axial proximity to a plurality of stator coils. The magnet ring is radially bounded by inner and outer compression sleeves having coefficients of expansion (CTEs) respectively less than and greater than the CTE of the magnets. Unequal thermal contraction of the compression sleeves, when cooled by the process liquid, applies radial compression to the magnet ring, overcoming centrifugal forces and maintains the magnets in radial compression, thereby preventing fracturing or pulverizing of the magnets. The magnet ring can be a monolithic ring with alternating magnetic regions, a ring of closely abutting magnets, or a ring of discrete magnets surrounded by a barrier material having a CTE equal to the magnet CTE.

17 Claims, 9 Drawing Sheets

(51) Int. Cl.
    *F04D 7/02* (2006.01)
    *F04D 13/02* (2006.01)
    *F04D 13/06* (2006.01)
    *F04D 29/58* (2006.01)
    *H02K 1/2795* (2022.01)
    *H02K 21/24* (2006.01)

(52) U.S. Cl.
    CPC .............. *F04D 1/04* (2013.01); *F04D 13/024* (2013.01); *F04D 13/0653* (2013.01); *F04D 13/0666* (2013.01); *F04D 29/2227* (2013.01); *F04D 29/5806* (2013.01); *F04D 29/588* (2013.01); *H02K 21/24* (2013.01)

(58) Field of Classification Search
    CPC ............. F04D 13/0666; F04D 29/2227; F04D 29/5806; F04D 29/588; H02K 1/2795; H02K 21/24
    See application file for complete search history.

(56) References Cited

U.S. PATENT DOCUMENTS

| | | | |
|---|---|---|---|
| 2,438,629 A | 3/1948 | Anderson | |
| 2,440,947 A | 5/1948 | Hart | |
| 2,752,857 A | 7/1956 | White | |
| 2,824,520 A | 2/1958 | Bartels | |
| 2,855,141 A | 10/1958 | Van Rijn | |
| 2,968,249 A | 1/1961 | Caine | |
| 3,102,679 A | 9/1963 | Rudy | |
| 3,135,212 A | 6/1964 | John | |
| 3,364,866 A * | 1/1968 | Sato | F04D 29/061 417/365 |
| 3,868,196 A | 2/1975 | Lown | |
| 4,213,745 A | 7/1980 | Roberts | |
| 4,508,998 A | 4/1985 | Hahn | |
| 4,806,080 A | 2/1989 | Mizobuchi | |
| 5,117,141 A | 5/1992 | Hawsey | |
| 5,158,440 A | 10/1992 | Cooper | |
| 5,269,664 A | 12/1993 | Buse | |
| 5,332,374 A | 7/1994 | Kricker | |
| 5,407,331 A | 4/1995 | Atsumi | |
| 5,494,418 A | 2/1996 | Moriya | |
| 5,567,133 A | 10/1996 | Kobaybashi | |
| 5,713,727 A | 2/1998 | Veronesi et al. | |
| 6,012,909 A | 1/2000 | Sloteman | |
| 6,034,465 A | 3/2000 | Mckee | |
| 6,056,518 A | 5/2000 | Allen | |
| 6,135,098 A | 10/2000 | Allen | |
| 6,175,173 B1 | 1/2001 | Stephan | |
| 6,422,838 B1 | 7/2002 | Sloteman | |
| 6,835,051 B2 | 12/2004 | Heim | |
| 7,067,950 B2 | 6/2006 | Hirzel | |
| 8,303,268 B2 | 11/2012 | Werson | |
| 11,323,003 B2 | 5/2022 | Judge et al. | |
| 2002/0035974 A1 | 3/2002 | Pawellek | |
| 2002/0106290 A1 | 8/2002 | Bader | |
| 2003/0021683 A1 | 1/2003 | Capone | |
| 2003/0132003 A1* | 7/2003 | Arauz | F04D 13/10 166/66.5 |
| 2004/0013547 A1 | 1/2004 | Allen | |
| 2005/0196269 A1 | 9/2005 | Racer | |
| 2007/0048158 A1 | 3/2007 | Kochan, Jr. | |
| 2009/0208349 A1 | 8/2009 | Eller | |
| 2011/0164995 A1 | 7/2011 | Genster | |
| 2011/0238172 A1 | 9/2011 | Akdis | |
| 2011/0318175 A1 | 12/2011 | Converse | |
| 2013/0022481 A1 | 1/2013 | Shoeb | |
| 2013/0028760 A1 | 1/2013 | Lin | |
| 2013/0213325 A1 | 8/2013 | Kim | |
| 2013/0236341 A1 | 9/2013 | Anderson | |
| 2015/0104335 A1 | 4/2015 | Faller | |
| 2016/0006379 A1 | 1/2016 | Wang et al. | |
| 2016/0072362 A1 | 3/2016 | Kube | |
| 2016/0305447 A1 | 10/2016 | Dreiss et al. | |
| 2017/0159665 A1 | 6/2017 | Bergamini | |
| 2019/0145428 A1 | 5/2019 | Judge et al. | |
| 2020/0067376 A1* | 2/2020 | Judge | F04D 1/08 |

FOREIGN PATENT DOCUMENTS

| | | |
|---|---|---|
| WO | 9908366 A1 | 2/1999 |
| WO | 2010081123 A1 | 7/2010 |

OTHER PUBLICATIONS

PCT International Search Report & Written Opinion for Appl No. PCT/US2018/060690 dtd Mar. 12, 2019, 17 pages.
Office Action for U.S. Appl. No. 16/204,997 dated Jul. 2, 2020, 6 Pages.
Office Action for U.S. Appl. No. 16/668,665, dated Dec. 4, 2020, 6 Pages.
Office Action for U.S. Appl. No. 16/668,665, dated Jan. 15, 2021, 50 Pages.
International Search Report and Written Opinion for PCT Appl. No. PCT/US2020/056972, mail date Feb. 17, 2021, 11 Pages.
Office Action for U.S. Appl. No. 16/668,665, dated May 3, 2021, 27 Pages.
Advisory Action for U.S. Appl. No. 16/668,665 mail date Jul. 14, 2021, 5 pages.
Notice of Allowance for U.S. Appl. No. 16/668,665 mail date Feb. 22, 2022, 17 Pages.
International Preliminary Report on Patentability for PCT Appl. No. PCT/US2020/056972 Mail Date May 12, 2022, 8 pages.
Office Action for India Appl. No. 202217025766, dated Aug. 18, 2022, 7 Pages.
Extended European Search Report of EP Appl No. 20882691.7, mail date Nov. 11, 2022, 8 pages.
Office Action for JP application No. 2022-524573 mail date Jul. 18, 2023, 6 pages.
Sloteman, Donald P., Piercy, mark, "Developing Sealless Integral Motor Pumps Using Axial Field Permanent Magnet", Disk Motors. IMP White Paper, 17th Pumps Symposium (2000), 16 pages.
Zhang, Fengge et al., "Rotor Retaining Sleeve Design for a 1.12-MW High-Speed PM Machine". IEEE Transactions on Industry Applications. (2015), 10 pages, (DOI10.1109/TIA.2015.2423659).
International Search Report and Written Opinion for PCT Application No. PCT/US2024/060913 mail date Mar. 31, 2025, 9 pages.

* cited by examiner

MECHANISM FOR MAINTAINING INTEGRITY OF PERMANENT MAGNETS IN DIRECTLY DRIVEN SEALLESS PUMPS AND TURBINES

RELATED APPLICATIONS

This application is related to U.S. Pat. No. 11,323,003, issued on May 3, 2022, which is herein incorporated by reference in its entirety for all purposes.

FIELD OF THE INVENTION

The invention relates to pumps and turbines, and more particularly, to integral motor pumps and integral motor turbines configured for application to cryogenic liquids.

BACKGROUND OF THE INVENTION

Application of pumps and turbines to cryogenic liquids can be challenging. One approach is to submerge a pump having one or more centrifugal pumping stages, or a turbine having one or more centrifugal turbine stages, in the cryogenic liquid with the impellers of the stages fixed to a common shaft extending to a motor or generator that is not submerged in the cryogenic liquid. However, for some applications this approach is not desirable, due to potential leakage of lubricants and/or process liquid past the seals that must be applied to the impeller shaft. Also, this approach can require significant maintenance and high operating costs. When applied to cryogenic liquids, reliable seals can be difficult and expensive to implement, and the impeller shaft can provide a significant channel through which heat can flow from the environment into the cryogenic liquid, thereby increasing boiloff of the liquid.

Another approach is to use a "seal-less" submersible pump or turbine that includes a submerged electrical motor or generator, shaft, and impellers, all contained within a common housing, so that rotating shaft seals are not required. However, even when using a seal-less pump or turbine, liquid hydrogen poses special problems due to its very low temperature, and to its exceedingly low density.

The collection, transport, and distribution of liquid hydrogen (LH2) is of increasing importance, due to the growing use of hydrogen as a fuel supply. In particular, "green" hydrogen is expected to play a critical role in reducing carbon emissions over the next few decades. The term "green" hydrogen refers to hydrogen that is produced using renewable clean energy sources, such as solar power and wind power.

Renewable energy generators, such as windmills and solar panels, can sometimes be installed proximate energy consumption locations, such as placing solar panels on the roof of a building or installing a windmill next to a factory. However, this approach is limited, due to siting constraints and economies of scale. Instead, it is often preferable to construct large green energy facilities in optimal locations, such as large solar panel arrays in deserts or windmill farms in coastal waters, and then to convey their power output to remote locations of energy consumption. In addition to taking advantage of favorable environments, and gaining economy of scale, this approach has the advantage of being able to utilize existing electrical power distribution networks to benefit larger numbers of energy consumers. However, it remains necessary to site such facilities near the electrical grids of consumers.

Instead, with reference to FIG. 1, green energy produced 102 at a remote location 100 that includes a source of water 104 can be used to generate hydrogen gas via hydrolysis 106. The hydrogen gas is compressed 108, and can be distributed to electrical generation plants wherever it is needed, in a manner similar to natural gas distribution. As with natural gas, it is often more efficient to liquify 110 hydrogen gas before it is transported 116, thereby eliminating safety concerns associated with gas pressurization, and enabling an increased energy density to be enclosed within a given container space. Typically, the LH2 is stored 112, and then transferred 114 to ships, train cars, or trucks as needed. Finally, after the LH2 has been shipped 116 to an import location 118, it is transferred 120 and stored 122 in a storage container, from which it can be transferred to local energy generating plants, e.g. by trucks 124.

This approach requires that liquid hydrogen LH2 be pumped from the liquification apparatus 110 into a storage container 112, and then unloaded 114 and pumped to a container of a ship or other transport vehicle 116. The LH2 is then pumped from the transporting vehicle 116 to an import storage container 120, and finally it is pumped from local storage 122 to local distribution vehicles 124 such as trucks. Energy efficient pumping of LH2 is therefore a critical component of this approach.

Efficient pumping of LH2 is therefore a critical requirement of this approach of using LH2 to distribute energy from production sites to consumers. If the LH2 is not pumped rapidly and efficiently, there will be significant losses of LH2 due to boil-off.

The very low density of LH2 significantly reduces the differential pressure generated by traditional centrifugal pump designs, because the differential pressure generated by a centrifugal pump is proportional to the product of the pumped liquid density and the head generated by the pump. Accordingly, it can be desirable to significantly increase the head of a pump design so as to achieve a desired pressure difference when pumping a very low-density liquid such as LH2.

There are two basic approaches that can be followed, separately or in combination, to increase the head that is generated by a centrifugal pump. One approach is to modify the impellers, for example by enlarging the impeller blades and/or adding additional impeller blades. However, this approach tends to be energy inefficient. A more desirable approach is to operate the pump at a very high speed, which can efficiently increase the pressure differential by taking advantage of the fact that the head generated by a centrifugal pump is proportional to the square of the impeller speed.

However, operating a centrifugal pump at very high speeds can be problematic, due to harmonic resonance frequencies or "eigenfrequencies" that arise in the pump, especially in the rotating shaft. This issue can be minimized by implementing "direct drive" of the impeller, whereby permanent magnets are mounted to the impeller, and configured to pass in close proximity to energizing coils provided in a stator. Energy is thereby imparted directly to the impeller, without any need for a rotating shaft. The "rotor," i.e. the aggregate of the rotating components, therefore consists only of the impeller and attached permanent magnets, and possibly also a bearing that provides a rotation interface between the impeller and the stationary shaft. In other implementations, the shaft is fixed to the impeller and supported by a bearing, such that the impeller and shaft rotate together, while the bearing is stationary.

Pumps that implement directly driven impellers are referred to herein as "integral motor-pumps" or IMPs, and turbines that implement directly driven impellers are referred to herein as "integral motor turbines" or IMTs. For simplicity, the present disclosure sometimes refers simply to IMPs, i.e. to pumps that include motors. However, it will be understood that the disclosure presented herein applies equally to turbines that include generators, and that references herein to IMPs and other pumps refer generically to both pumps (IMPs) and turbines (IMTs), while references to motors refer generically to motors and generators or alternators, unless otherwise stated or required by context.

For many applications, it is desirable to configure an IMP such that the permanent magnets and stator coils are axially aligned with each other. This approach tends to be more compact than radial designs due to its higher magnetic density. Nevertheless, the permanent magnets can be subjected to large centrifugal forces when the pump or turbine is in operation. For conventional applications, the permanent magnets are often able to withstand these centrifugal forces, especially if the rotor can be operated at lower speeds, and/or at moderate temperatures. However, when exposed to extremely low temperatures and very high rotational speeds, for example speeds in excess of 10,000 rpm, the permanent magnets, which are typically ceramic or rare earth magnets such as samarium cobalt or neodymium magnets, can become brittle, and can be cracked or pulverized by the excessive centrifugal forces.

What is needed, therefore, is an axial direct drive IMP or IMT that can maintain the integrity of its permanent magnets when operated at very low temperatures and very high rotational speeds.

SUMMARY OF THE INVENTION

The present invention is an axial direct drive IMP or IMT that maintains the integrity of its permanent magnets when operated at very low temperatures and very high rotational speeds. For simplicity, the present disclosure sometimes refers simply to IMPs, i.e. to pumps that include motors. However, it will be understood that the disclosure presented herein applies equally to turbines that include generators, and that references herein to IMPs and other pumps refer generically to both integral motor pumps (IMPs) and integral motor (generator) turbines (IMTs), while references to motors refer generically to motors and generators or alternators, unless otherwise stated or required by context.

According to the present invention, the permanent magnets of the rotor are arranged within a compression sleeve assembly that maintain the magnets under radial compression, even when operating at very high speeds. Because the magnets never cross into a tensile state, they do not crack or pulverize.

The permanent magnets of the present invention are arranged as an annular ring of magnets. In some embodiments, the magnet ring is a ring of separate magnets that are fixed within the rotor housing by a surrounding resin or other bonding material. In other embodiments, the magnets are formed as a single ring that is mounted to a backing plate, which can be a magnetically conductive plate, such as a plate that comprises ferromagnetic iron. The single ring can be a monolithic ring comprising alternating zones of forward and reverse magnetization, or a ring of separate, closely abutting magnets.

The annular ring is bounded by inner and outer compression sleeves that are shaped essentially as concentric hollow cylinders or bands and have differing coefficients of thermal expansion (CTEs). The outer of these two compression sleeves is made from a material, such as a metal alloy, having a CTE that is equal to or greater than the CTE of the magnets, while the inner compression sleeve is made from a different material, such as a different metal alloy, that has a CTE that is equal to or less than that of the magnets. Accordingly, either the CTE of the outer compression sleeve is greater than the CTE of the magnets, the CTE of the inner compression sleeve is less than the CTE of the magnets, or both.

As the rotor is cooled to the cryogenic temperature of the process liquid, the unequal contraction of the compression sleeves applies additional radial compression to the magnets that is sufficient to overcome the radial centrifugal forces to which the magnets are subjected when the pump or turbine is operating at high speeds. The materials from which the compression sleeves are formed can be selected such that even at the highest operational speed of the IMP or IMT the magnet ring will remain in a compressive state.

If the magnet ring is a ring of separate magnets separated by a bonding material, the bonding material can be selected to have a CTE that is equal to the CTE of the magnets.

The magnet ring and compression sleeves can be contained within a rotor housing, which can be sealed by a rotor cover plate that is welded or otherwise fixed to the rotor housing.

Accordingly, the present invention takes advantage of the cryogenic temperature of the process liquid as a mechanism for increasing the compression of the magnets and enabling them to rotate at very high speeds without transitioning to a state of tension, thereby avoiding cracking or disintegration of the magnets.

The present invention is an integral motor pump (IMP) or integral motor turbine (IMT) configured for application to a process liquid having a liquid temperature that is below ambient temperature. The IMP or IMT includes a module housing configured to enable the process liquid to pass from an input thereof to an output thereof, a stator housing contained within and fixed to the module housing, a shaft extending axially and proximally from the stator housing along a longitudinal axis of the IMP or IMT, an impeller rotatable with or about the shaft, a plurality of permanent magnets fixed to a distal face of the impeller and configured to pass in proximity to a proximal face of the stator housing when the impeller rotates, the plurality of permanent magnets being arranged as an annular magnet ring that surrounds the longitudinal axis of the IMP or IMT, and a plurality of stator coils contained within an interior of the stator housing and configured to be axially proximate the permanent magnets as they pass in proximity to the proximal face of the stator housing, the permanent magnets and stator coils being axially separated by a rotor-stator gap.

The annular magnet ring is surrounded and radially bounded by an outer compression ring having an outer CTE that is equal to or greater than a magnet CTE of the permanent magnets, and surrounds and is radially bounded by an inner compression ring having an inner CTE that is equal to or less than the magnet CTE, wherein the outer CTE is greater than the magnet CTE, the inner CTE is less than the magnet CTE, or both. The permanent magnets are thereby radially compressed due to unequal thermal contraction of the permanent magnets and the inner and outer compression ring s when the inner and outer compression ring s and the permanent magnets are cooled by the process liquid.

In embodiments, the process liquid is liquid hydrogen.

In any of the above embodiments, the permanent magnets can be ceramic magnets or rare earth magnets.

In any of the above embodiments, at ambient temperature, the magnet ring can be radially compressed due to an interference fit between the magnet ring and the inner and outer compression ring s, said radial compression being increased due to the unequal thermal contraction of the permanent magnets and the inner and outer compression ring s when the inner and outer compression ring s and the permanent magnets are cooled to the liquid temperature of the process liquid.

In any of the above embodiments, the magnet ring can be a ring of permanent magnets that are spaced apart and surrounded by a bonding material having a bonding CTE that is equal to the magnet CTE. Or the magnet ring can be a ring of permanent magnets that are arranged in a closely packed, mutually abutting configuration in the magnet ring. Or the magnet ring can be a monolithic ring of magnet material comprising alternating zones of forward and reverse magnetization.

In any of the above embodiments, the permanent magnets can be mounted to an underlying magnetically conducting backing plate, which can contain ferromagnetic iron.

In any of the above embodiments, the difference between the inner CTE and the outer CTE can ensure that the permanent magnets remain in a radially compressed state when the impeller is rotated at a maximum operating speed of the IMP or IMT.

In any of the above embodiments, the magnet ring can be contained within a rotor housing that is fixed to the distal face of the impeller. Some of these embodiments further include a rotor housing cover plate that is sealed to the rotor housing, thereby preventing physical contact between the process liquid and the magnet ring.

In any of the above embodiments, the shaft can be fixed to the stator housing and is stationary, the impeller being configured to rotate about the shaft. Some of these embodiments further include a bearing that provides a rotation interface between the impeller and the stationary shaft. The bearing can be lubricated by the process liquid.

Or, the impeller can be fixed to the shaft, and the shaft can be suspended by at least one bearing, thereby allowing the shaft to rotate together with the impeller. In some of these embodiments, the bearing is lubricated by the process liquid.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an axial direct drive IMP or IMT that maintains the integrity of its permanent magnets when operated at very low temperatures and very high rotational speeds. For simplicity, the present disclosure sometimes refers simply to IMPs, i.e. to pumps that include motors. However, it will be understood that the disclosure presented herein applies equally to turbines that include generators, and that references herein to IMPs and other pumps refer generically to both integral motor pumps (IMPs) and integral motor (generator) turbines (IMTs), while references to motors refer generically to motors and generators or alternators, unless otherwise stated or required by context.

Figure 1:
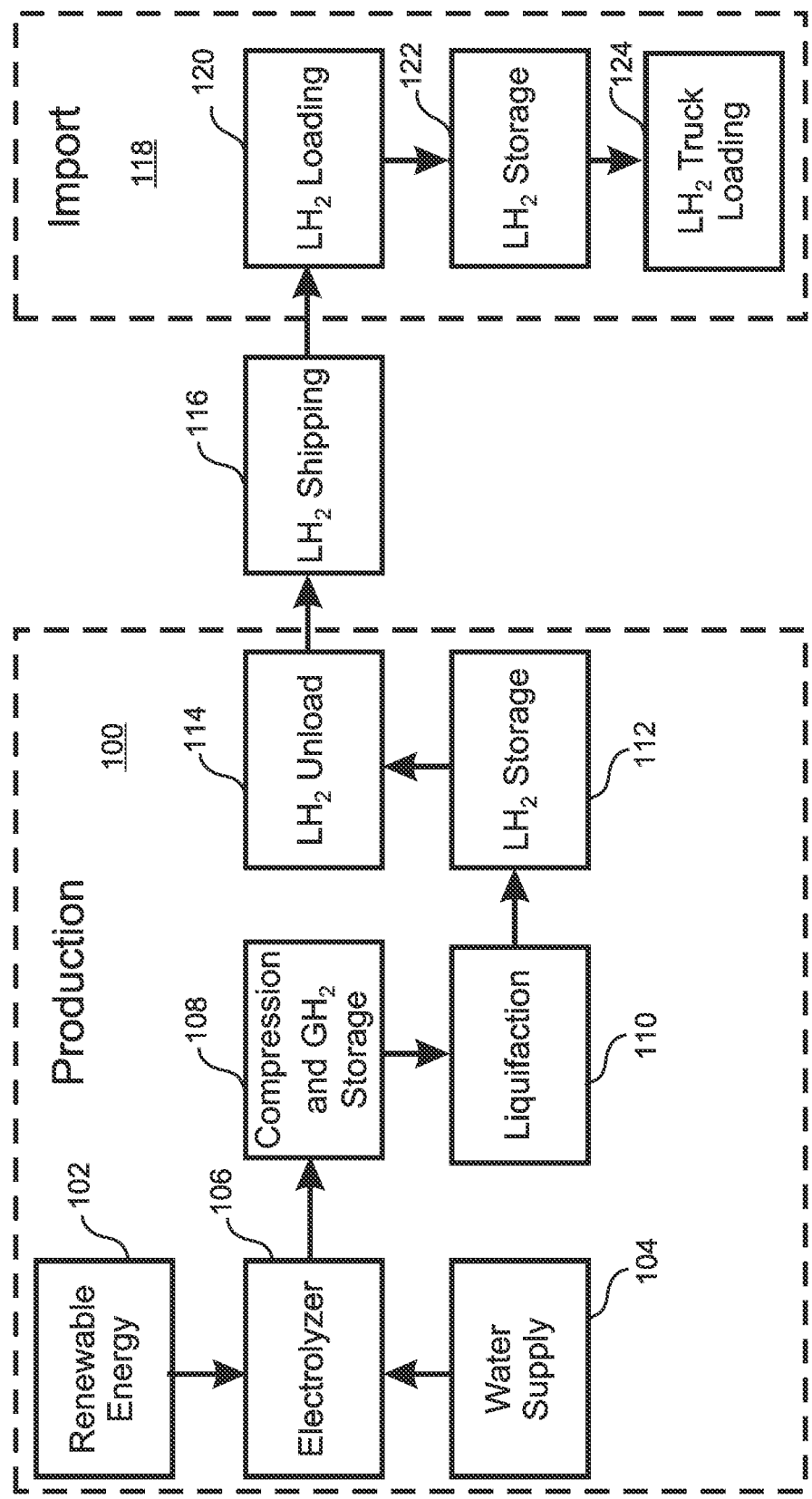
FIG. 1 is a flow diagram illustrating the use of liquid hydrogen in the prior art as a medium for transferring energy from a green energy production site to an energy consumption location.
Figure 2A:
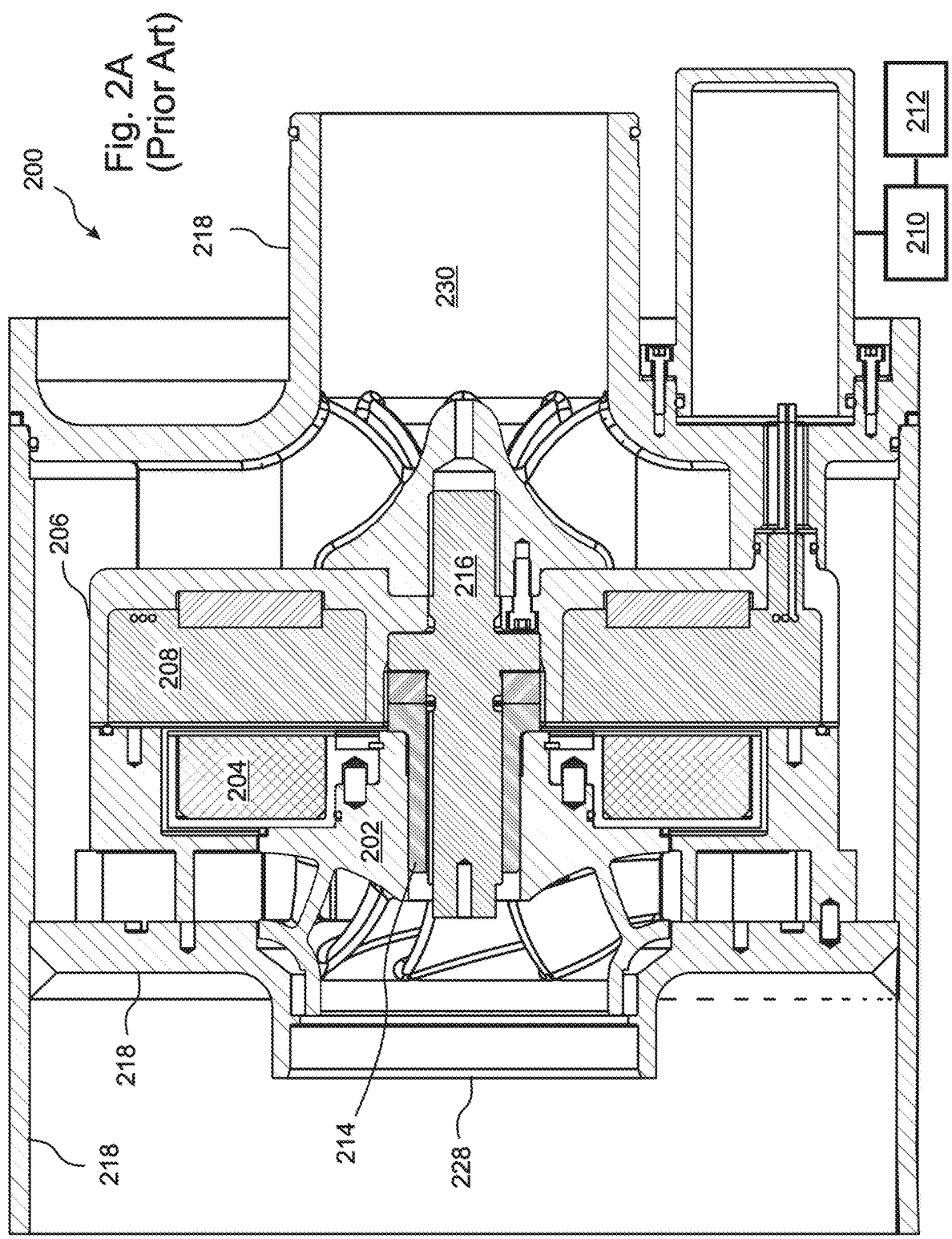
FIG. 2A is a sectional view of an IMP or IMT of the prior art, where the figure is drawn to scale except for elements 210 and 212.
Figure 2B:
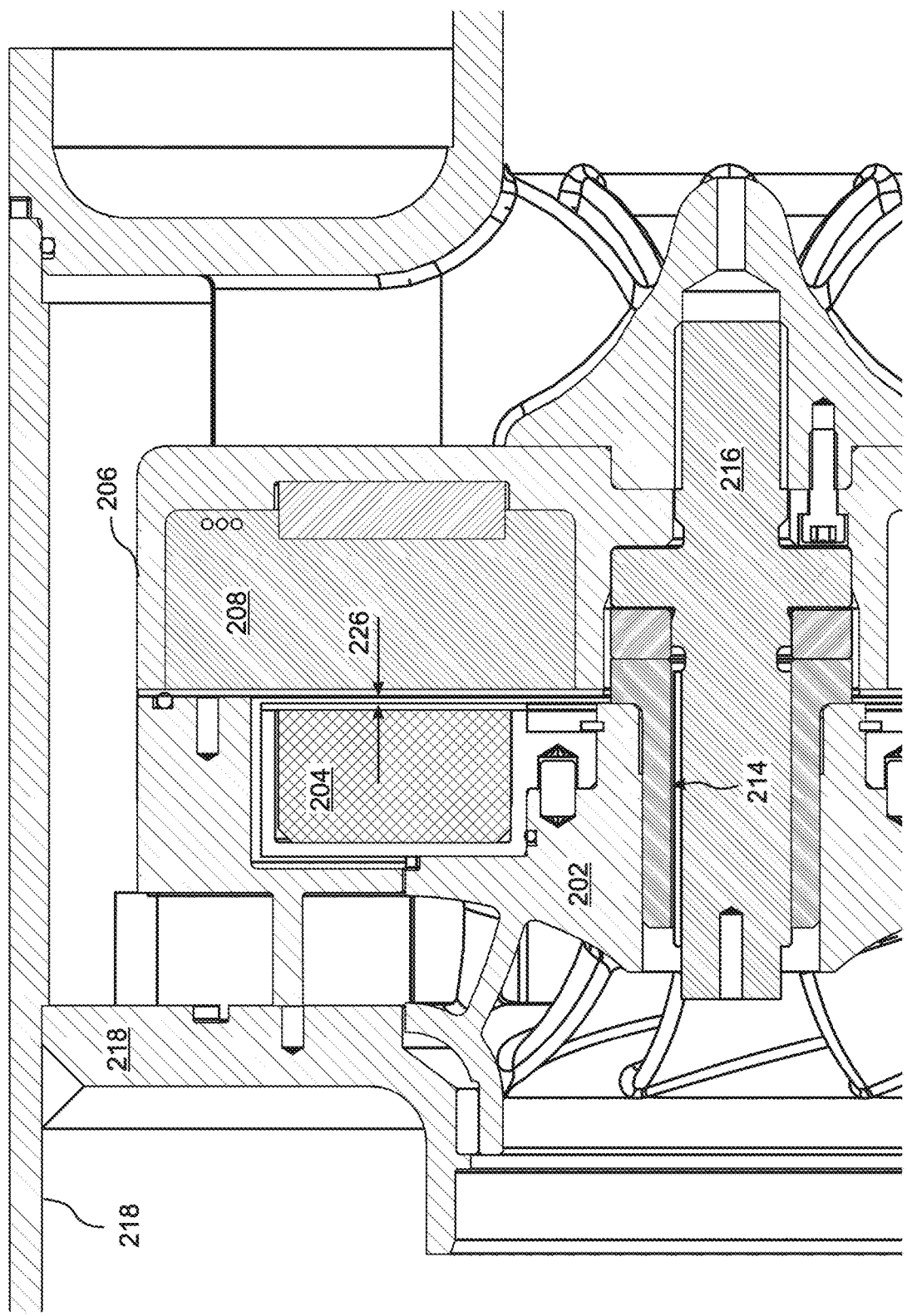
FIG. 2B is a close-up view drawn to scale of a portion of the IMP or IMT of FIG. 2A.

FIGS. 2A and 2B illustrate an IMP of the prior art that shares many features with embodiments of the present invention. The IMP of FIGS. 2A and 2B is configured to direct a process liquid from a module inlet 228 to a module outlet 230. The "rotor," i.e. the assembly of rotating components, in the IMP 200 comprises an impeller 202 and a plurality of permanent magnets 204 that are cooperative with the impeller 202. The IMP 200 further includes a stator housing 206 containing stator coils 208 that are positioned in axial opposition to the permanent magnets 204. The stator coils 208 are energized by a power source 210 that is actuated by a controller 212, and the magnets 204 and stator coils 208 function cooperatively together as a synchronous motor that applies rotational torque directly to the impeller 202. In some embodiments, the power source 210 is an adjustable speed drive (ASD), such as a variable frequency drive (VFD), which enables the impeller rotation rate to be variable.

In addition to the impeller 202 and the permanent magnets 204, the rotor in the illustrated embodiment comprises a bearing 214 that is configured to allow the impeller 202 to rotate about a fixed, non-rotating shaft 216. In the illustrated embodiment, the bearing 214 is product lubricated, and the shaft 216 is a rotor positioning "stud" that is firmly anchored to the stator housing 206, which is firmly attached to the IMP housing 218. In similar embodiments, the impeller 202 is fixed to the shaft 216, and the shaft 216 is suspended by one or more bearings so that it can rotate together with the impeller 202. In the illustrated embodiment, the shaft 216 is only slightly longer than the bearing 214. It can be seen in the close-up, partial view of FIG. 2B that only a very narrow axial gap 226 separates the permanent magnets 204 from the stator coils 208.

Figure 3:
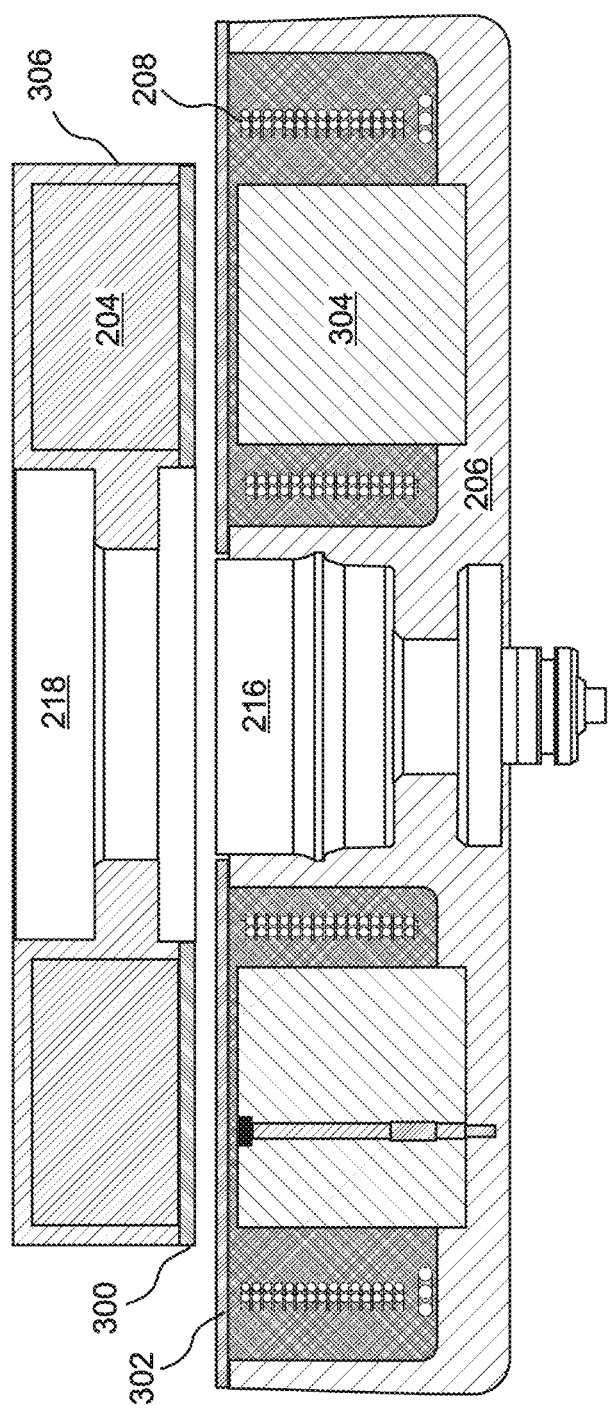
FIG. 3 is a sectional view from the side, drawn to scale, of a stator housing and associated elements shown in opposition to a rotor housing containing a ring of permanent magnets, according to the prior art.

FIG. 3 is a sectional view from the side, according to a similar example of the prior art, of a stator housing 206 and associated elements shown in opposition to rotor housing 306 that contains the permanent magnets 204. The rotor housing cover plate 300 and the stator cover plate 302 are also shown, as well as the laminated iron cores 304 about which the stator coils 208 are wound.

Figure 4A:
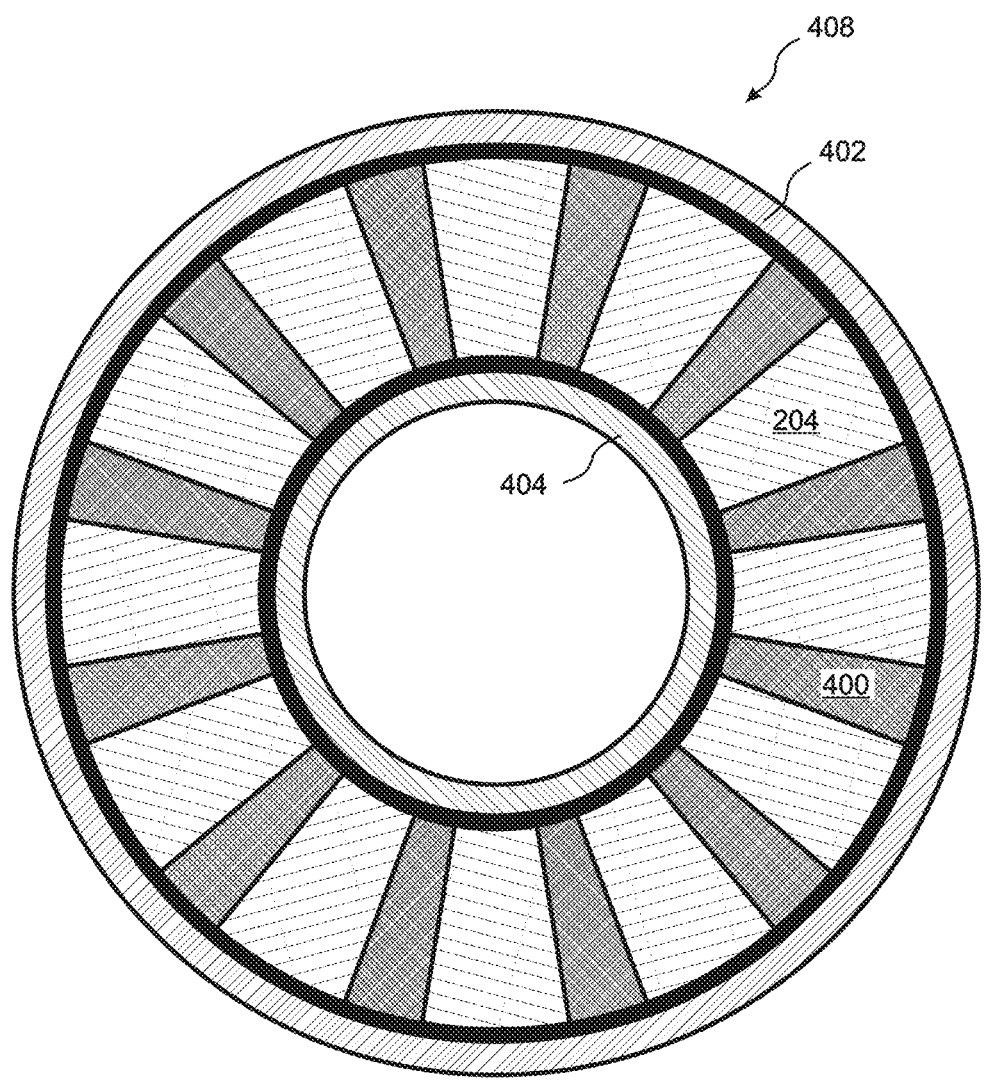
FIG. 4A is a view from above of a magnet ring comprising a plurality of separate permanent magnets that are fixed within a rotor housing by a surrounding resin barrier material according to an embodiment of the present invention.
Figure 4B:
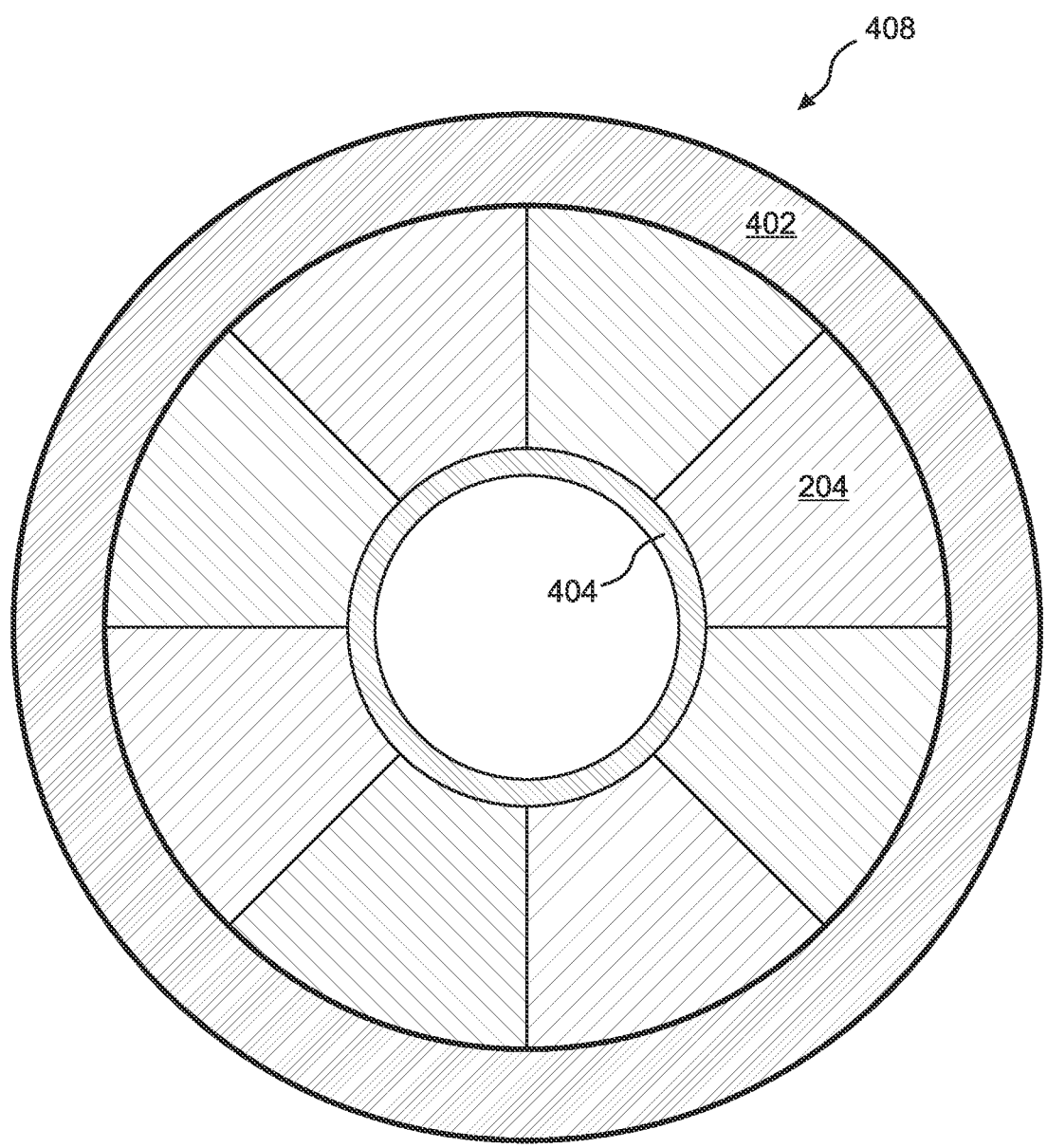
FIG. 4B is a view from above, drawn to scale, of a monolithic magnet ring comprising alternating zones of forward and reverse magnetization, according to an embodiment of the present invention.

With reference to FIGS. 4A and 4B, according to the present invention, the magnets 204 are arranged as an annular magnet ring 408 that is bounded by inner 404 and outer 402 compression sleeves shaped essentially as hollow cylinders or bands that have differing coefficients of thermal expansion (CTEs). The outer 402 of the two compression sleeves 402, 404 is made from a material, which can be a metal alloy, having a CTE that is equal to or greater than the CTE of the magnets 204, while the inner 404 compression sleeve is made from a different material, such as a different metal alloy, that has a CTE that is equal to or less than the CTE of the magnets 204. Accordingly, either the CTE of the outer compression sleeve 402 is greater than the CTE of the magnets 204, the CTE of the inner compression sleeve 404 is less than the CTE of the magnets 204, or both. As a result, the uneven contraction of the compression sleeves 402, 404 as the magnet ring 408 is cooled increases the radial compression of the magnets 204.

In the embodiment of FIG. 4A, the magnets 204 are separate magnets that are fixed within the rotor housing 306 by a surrounding resin 400 or other bonding material. In some of these embodiments a bonding material 400 is selected having a CTE that is substantially equal to the CTE of the magnets 204.

In the embodiment of FIG. 4B, the magnet ring 408 is a monolithic ring comprising alternating zones of forward and reverse magnetization. In similar embodiments, the magnet ring 408 is a continuous ring formed by separate, closely abutting magnets. In FIGS. 4A and 4B, the cross-hatching of elements 204 indicates the polarities of the segments of the magnet ring 408, which alternate between "N" and "S."

Figure 4C:
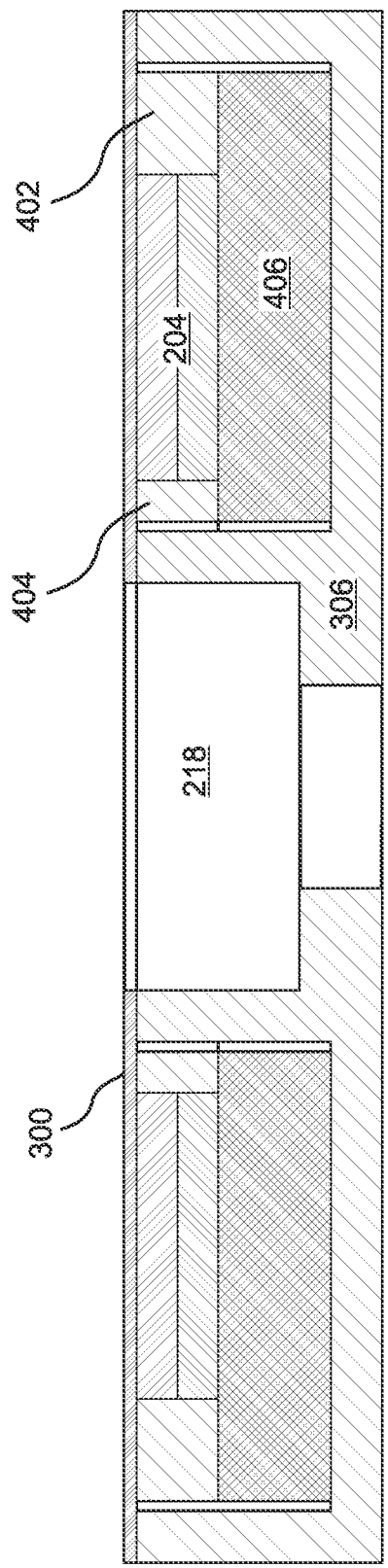
FIG. 4C is a cross-sectional view from the side, drawn to scale, of a rotor housing in which the magnet ring is a monolithic magnet ring comprising alternating zones of forward and reverse magnetization, as shown in FIG. 4B, and is mounted to a common, magnetically conductive backing plate, according to an embodiment of the present invention.
Figure 4D:
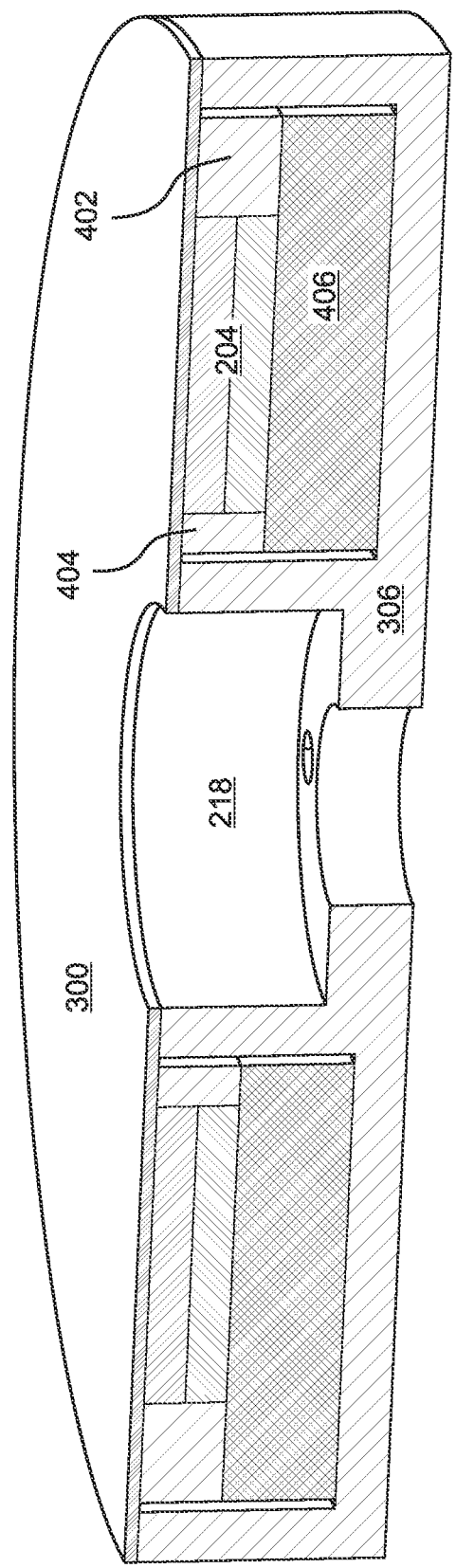
FIG. 4D is a perspective cross-sectional view, drawn to scale, of the embodiment of FIG. 4C.

FIGS. 4C and 4D are side and perspective sectional views respectively of a rotor housing 306 in which the permanent magnets 204 are arranged in a closely packed contiguous ring 408, as shown in FIG. 4B, and mounted to a common backing plate 406, which can be a magnetically conductive plate, such as a plate that comprises ferromagnetic iron.

Figure 5:
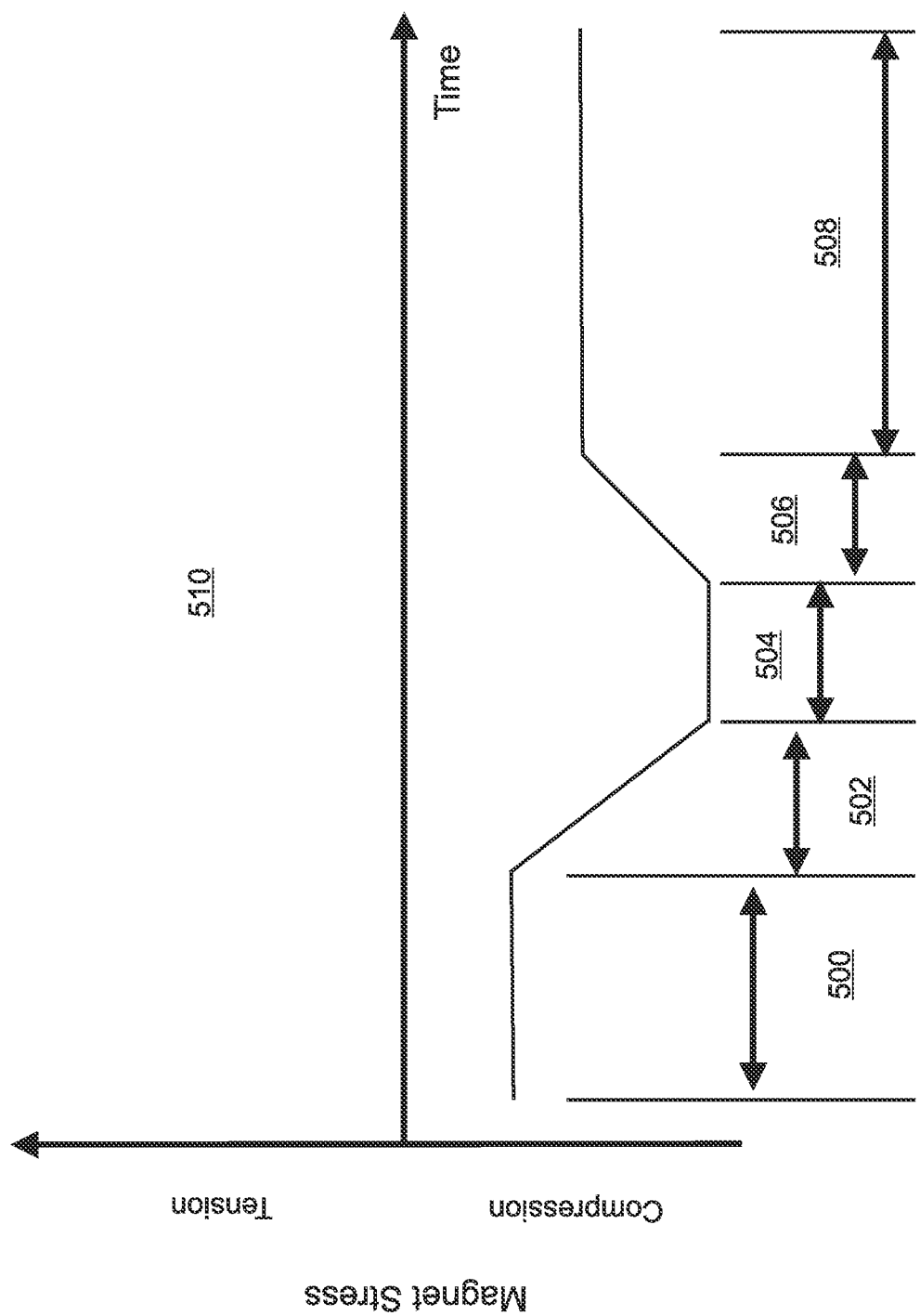
FIG. 5 is a graph that illustrates states of radial compression of a magnet ring during successive stages of operation of the disclosed IMP or IMT, according to an embodiment of the present invention.

With reference to FIG. 5, in embodiments the magnets 204 are initially compressed 500 upon installation in the rotor housing 306 between the compression sleeves 402, 404 due to an interference fit of the magnet ring between the compression sleeves 402, 404. As the rotor housing 306 is cooled 502 to the cryogenic temperature of the process liquid, the unequal contraction of the compression sleeves 402, 404 results in additional radial compression of the magnets 204. The assembly of the magnets 204 compression sleeves 402, 404, and rotor housing 306 is then allowed to stabilize and come to thermal equilibrium 504. As the rotor 202 begins to rotate, and its rotation speed increases, the resulting centrifugal forces partially offset the compressive forces applied by the compression sleeves 402, 404, and reduce the degree of magnet compression 506. However, the materials from which the compression sleeves 402, 404 are formed are selected according to their CTEs so that even during the highest anticipated operational speed of the rotor 508, the centrifugal forces will be unable to completely overcome the compression that is applied by the cryogenically cooled compression sleeves 402, 404, and the magnets 204 will remain in a compressive state. And because the magnets 204 never cross into a tensile state 510, they do not crack or pulverize.

Accordingly, the present invention takes advantage of the cryogenic temperature of the process liquid as a mechanism for compressing the magnets 204, enabling the impeller to rotate at very high speeds without allowing the magnets 204 to transition to a state of tension, and thereby avoiding cracking or disintegration of the magnets 204.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An integral motor pump (IMP) or integral motor turbine (IMT) configured for application to a process liquid having a liquid temperature that is below ambient temperature, the IMP or IMT comprising:
   a module housing configured to enable the process liquid to pass from an input thereof to an output thereof;
   a stator housing contained within and fixed to the module housing;
   a shaft extending axially and proximally from the stator housing along a longitudinal axis of the IMP or IMT;
   an impeller rotatable with or about the shaft;
   a plurality of permanent magnets fixed to a distal face of the impeller and configured to pass in proximity to a proximal face of the stator housing when the impeller rotates, the plurality of permanent magnets being arranged as an annular magnet ring that surrounds the longitudinal axis of the IMP or IMT; and
   a plurality of stator coils contained within an interior of the stator housing and configured to be axially proximate the permanent magnets as the permanent magnets pass in proximity to the proximal face of the stator housing, the permanent magnets and stator coils being axially separated by a rotor-stator gap;
   wherein:
      the annular magnet ring is surrounded and radially bounded by an outer compression sleeve having an outer CTE that is equal to or greater than a magnet CTE of the permanent magnets; and
      the annular magnet ring surrounds and is radially bounded by an inner compression sleeve having an inner CTE that is less than the magnet CTE; and the permanent magnets being radially compressed due to unequal thermal contraction of the permanent magnets and the inner and outer compression sleeves when the inner and outer compression sleeves and the permanent magnets are cooled by the process liquid.

2. The IMP or IMT of claim 1, wherein the process liquid is liquid hydrogen.

3. The IMP or IMT of claim 1, wherein the permanent magnets are ceramic magnets or rare earth magnets.

4. The IMP or IMT of claim 1, wherein, at the ambient temperature, the magnet ring is radially compressed due to an interference fit between the magnet ring and the inner and outer compression sleeves, said radial compression being increased due to the unequal thermal contraction of the permanent magnets and the inner and outer compression sleeves when the inner and outer compression sleeves and the permanent magnets are cooled to the liquid temperature of the process liquid.

5. The IMP or IMT of claim 1, wherein the magnet ring is a ring of permanent magnets that are spaced apart and surrounded by a bonding material having a bonding CTE that is equal to the magnet CTE.

6. The IMP or IMT of claim 1, wherein the magnet ring is a ring of permanent magnets that are arranged in a closely packed, mutually abutting configuration in the magnet ring.

7. The IMP or IMT of claim 1, wherein the magnet ring is a monolithic ring of magnet material comprising alternating zones of forward and reverse magnetization.

8. The IMP or IMT of claim 1, wherein the permanent magnets are mounted to an underlying magnetically conducting backing plate.

9. The IMP or IMT of claim 8, wherein the backing plate contains ferromagnetic iron.

10. The IMP or IMT of claim 1, wherein a difference between the inner CTE and the outer CTE ensures that the permanent magnets remain in a radially compressed state when the impeller is rotated at a maximum operating speed of the IMP or IMT.

11. The IMP or IMT of claim 1, wherein the magnet ring is contained within a rotor housing that is fixed to the distal face of the impeller.

12. The IMP or IMT of claim 11, further comprising a rotor housing cover plate that is sealed to the rotor housing, thereby preventing physical contact between the process liquid and the magnet ring.

13. The IMP or IMT of claim 1, wherein the shaft is fixed to the stator housing and is stationary, the impeller being configured to rotate about the shaft.

14. The IMP or IMT of claim 13, further comprising a bearing that provides a rotation interface between the impeller and the stationary shaft.

15. The IMP or IMT of claim 14, wherein the bearing is lubricated by the process liquid.

16. The IMP or IMT of claim 1, wherein the impeller is fixed to the shaft, and the shaft is suspended by at least one bearing, thereby allowing the shaft to rotate together with the impeller.

17. The IMP or IMT of claim 16, wherein the bearing is lubricated by the process liquid.

* * * * *